United States Patent
Dutta et al.

(10) Patent No.: US 6,925,594 B2
(45) Date of Patent: Aug. 2, 2005

(54) SAVING SELECTED HYPERLINKS FOR RETRIEVAL OF THE HYPERLINKED DOCUMENTS UPON SELECTION OF A FINISHED READING BUTTON IN A WEB BROWSER

(75) Inventors: Rabindranath Dutta, Austin, TX (US); Kamal Chandrakant Patel, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 819 days.

(21) Appl. No.: 09/796,036

(22) Filed: Feb. 28, 2001

(65) Prior Publication Data

US 2002/0120646 A1 Aug. 29, 2002

(51) Int. Cl.[7] .............................................. G06F 15/00
(52) U.S. Cl. ....................... 715/501.1; 715/513; 707/10
(58) Field of Search .............................. 715/501.1, 500, 715/530, 513; 707/10; 709/218

(56) References Cited

U.S. PATENT DOCUMENTS

| | | | |
|---|---|---|---|
| 5,854,630 A | * 12/1998 | Nielsen | ........................ 345/739 |
| 5,918,239 A | 6/1999 | Allen et al. | |
| 5,937,163 A | * 8/1999 | Lee et al. | .................... 709/218 |
| 5,961,602 A | 10/1999 | Thompson et al. | |
| 5,991,760 A | * 11/1999 | Gauvin et al. | ................. 707/10 |
| 6,061,695 A | * 5/2000 | Slivka et al. | ................ 715/513 |
| 6,096,096 A | 8/2000 | Murphy et al. | |
| 6,119,135 A | 9/2000 | Helfman | |
| 6,216,141 B1 | * 4/2001 | Straub et al. | ................ 715/513 |
| 6,643,651 B1 | * 11/2003 | Pearsall | ........................ 707/10 |

FOREIGN PATENT DOCUMENTS

| | | |
|---|---|---|
| GB | 0890907 B1 | 6/2000 |
| GB | 2350213 A | 11/2000 |

* cited by examiner

*Primary Examiner*—Stephen Hong
*Assistant Examiner*—Jonathan Schlaifer
(74) *Attorney, Agent, or Firm*—Marilyn Smith Dawkins

(57) ABSTRACT

The system, method and program of this invention enhances a Web browser by enabling a user to select hyperlinks of interest while reading a first document. The selected hyperlinks are not displayed by the Web browser until indicated to do so by a user. In the meantime, the Web browser stores the list of selected hyperlinks in a list. When a user finishes reading the first document, and now desires to view the selected hyperlinked documents, the user selects a "finished reading" button. Upon the selection of the button, the Web browser displays a next hyperlinked document according to the order of selected hyperlinks in the list.

18 Claims, 5 Drawing Sheets

SAVING SELECTED HYPERLINKS FOR RETRIEVAL OF THE HYPERLINKED DOCUMENTS UPON SELECTION OF A FINISHED READING BUTTON IN A WEB BROWSER

BACKGROUND OF THE INVENTION

1. Field of the Invention

This invention relates to accessing information in a computer network environment such as the Internet, and more specifically to a system, method, and program for enabling a user to select hyperlinks while reading a displayed first document, but not retrieving the hyperlinked documents until the user has indicated that the user has finished reading the displayed first document.

2. Description of the Related Art

As computational devices continue to proliferate throughout the world, there also continues to be an increase in the use of networks connecting these devices. Computational devices include large mainframe computers, workstations, personal computers, laptops and other portable devices including wireless telephones, personal digital assistants, automobile-based computers, etc. Such portable computational devices are also referred to as "pervasive" devices. The term "computer" or "computational device", as used herein, may refer to any of such device which contains a processor and some type of memory.

The computational devices may be connected in any type of network including the Internet, an intranet, a local area network (LAN) and/or a wide area network (WAN). The network connections may be wired or wireless communication links or fiber optic cables. Many such networks may be organized using a client/server architecture, in which "server" computational devices manage resources, such as files, peripheral devices, or processing power, which may be requested by "client" computational devices. "Proxy servers" can act on behalf of other machines, such as either clients or servers.

A widely used network is the Internet. The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

A Web browser on a client enables a user to specify a Web location through a displayed link or by inputting the URL of the location. The Web browser sends the URL request using the HTTP protocol. The request is sent to the Internet which determines which server to send the request to. A Web server receives the request using the HTTP protocol; and sends the requested page, document, or object (including image, video, audio, etc.) to the Web browser client. The content is displayed on the client's computer screen through the Web browser. It should be noted that a page, document, or object is referred to as a document or as content. The terms "document" and "content" are used interchangeably herein.

The displayed content typically contains hyperlinks to other content. By clicking on the hyperlink, the hyperlinked content is displayed as a result of the communication between the Web browser and a Web server as discussed above. Since each displayed hyperlinked document may also contain hyperlinks to other documents, it is possible for a user to branch further and further away from the document initially displayed. To help a user return to previously displayed content, a Web browser has a "back" and "forward" button. With each click of the "back" button, the user can step back through the linked documents in the reverse order that they were initially traversed. The "back" button is a very useful feature for users using a Web browser. It helps users from getting lost as they traverse down various hyperlinked paths; and it ensures that the users can get back to a beginning of a path of traversed hyperlinks.

Although the "back" button is an indispensable feature in Web browsers, it does have its drawbacks and inconveniences in some situations. For example, before a user finishes reading a first document of interest, the user may come across a first hyperlink of interest. The user may select this hyperlink and end up branching further and further away from the original document as hyperlinks are followed in each subsequent document. If the user wants to get back to the first document of interest to finish reading it, the user may have to repeatedly select the back button until all of the subsequently displayed pages are redisplayed in reverse order and the first document is finally redisplayed. Again, as the user continues to read the first document, the user may find another hyperlink of interest and continue down one or more of the many paths of hyperlinked documents that it may lead to. Again, the user must repeatedly select the back button and wait for all of the subsequently displayed documents to be redisplayed in reverse order until the first document is redisplayed.

If the user just waits until the user finishes reading the first document before selecting a hyperlink of interest, the user may forget which hyperlinks were of initial interest to the user. The user may then unnecessarily reread portions of the document to try to remember which hyperlinks were of interest.

Also, even more problems are encountered when viewing Web documents on small devices such as personal digital assistants (PDAs), palmtops, Internet enabled cell phones, etc. The display area of these small devices is somewhat limited as compared to the display area for desktop or laptop computer systems. Due to limited screen real estate available on these small devices, a user may have to repeatedly select a page down key in order to view an entire page of interest. If a hyperlink of interest were to be selected after the user completed the reading of the document, then the user may have to repeatedly hit the back button and/or the page up key after reading the document in order to find and select the hyperlink of interest. Consequently, in order to finish reading a document before selecting a hyperlink, the user may have even more displayed screens of pages to go back through when using a small device as a Web client than when using a Web client having a larger screen display.

Each time the back button or page up key is selected, different screen data is rendered. Each time a user makes a selection (e.g., selecting a page up key or a back button), and each time different data is rendered to the screen display, more and more time is consumed. It is desirable to minimize the number of selections a user must make and the amount of time spent in making those selections and in rendering displayed pages.

SUMMARY OF THE INVENTION

It is therefore an object of this invention to minimize the amount of paging through displayed hyperlinked documents in order to finish reading a first document of interest.

It is a further object of this invention to minimize the amount of paging through displayed pages of a first document of interest in order to find and select a desired hyperlink after finishing to read the first document.

It is a further object of this invention to make the reading of Web documents on small devices easier and more time effective.

The system, method and program of this invention enhances a Web browser by enabling a user to select hyperlinks of interest while reading a first document. The selected hyperlinks are not requested by the Web browser until indicated to do so by a user. In the meantime, the Web browser stores the list of selected hyperlinks in a list. When a user finishes reading the first document, and now desires to view the selected hyperlinked documents, the user selects a "finished reading" button. Upon the selection of the button, the Web browser requests the hyperlinked documents according to the order of selected hyperlinks in the list.

In a preferred embodiment, a user first accesses a Web document. While reading the first document, the user selects the hyperlinks of interest. Upon selection of a hyperlink, the browser does not access the selected link immediately. Instead, the selected hyperlinks are stored in a sequential order or in some other predefined order. When the user desires to begin viewing the selected hyperlinked documents, such as after the user finishes reading the first document, the user selects a designated button. In a preferred embodiment, the button is a "finished reading" button. Such a button is inserted at the bottom of a page by the Web browser while rendering a page, or by a proxy server. Upon receiving the indication from the user through a selected button, the Web browser begins to render the next hyperlinked document from the list.

The above technique becomes iterative in that a "finished reading" button is also displayed at the bottom of each displayed hyperlinked document. If no other hyperlink is selected in a given displayed hyperlinked document, then no hyperlinks are added to the list during the display of that given displayed hyperlinked document. Nevertheless, the Web browser renders the next hyperlinked document in the list when the "finished reading" button is selected for the given displayed hyperlinked document. If one or more hyperlinked documents are selected in a given displayed hyperlinked document, then those hyperlinks are stored either sequentially, or in an order reflecting the nesting of the hyperlinked documents, or in a predefined order as specified or as altered by a user.

An advantage of the present invention is that a next hyperlinked document of interest is automatically displayed without a user further selecting the hyperlinked document from the list of selected hyperlinked documents. The Web browser automatically retrieves the next hyperlinked document on the list when a user indicates that the user is ready to view another document, such as by selecting a "finished reading" button.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
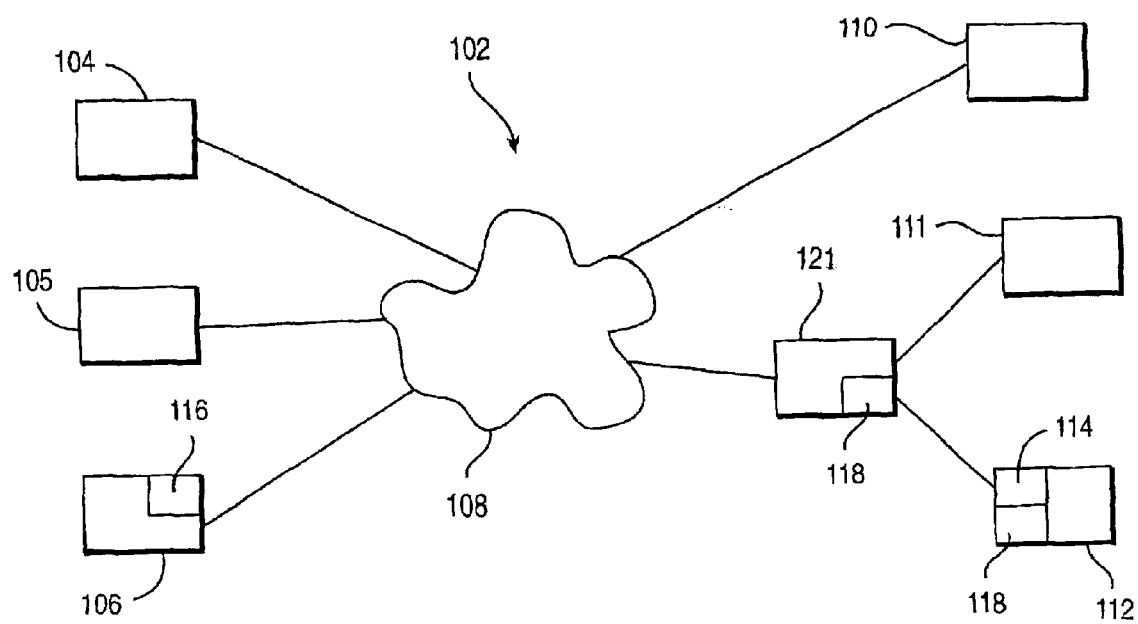
FIG. 1 illustrates a networked environment having servers, clients, and proxy servers.

With reference now to the figures, and in particular with reference to FIG. 1, a high-level block diagram of a data processing system network in which a preferred embodiment of the present invention may be implemented is depicted. Data processing network 102 includes one or more servers 104–106 which are accessible as part of the Internet 108 or other network. Data processing system network 102 also includes one or more clients, e.g., data processing systems 110–112, which may access servers 104–106. Proxy server 121 is also shown for clients 111 and 112. In a preferred embodiment, communications between data processing systems 104–106 and 110–112, including proxy server 121, occur over the Internet 108 and conform to the Hypertext Transfer Protocol (HTTP) in accordance with the known art, although other messaging system protocols may be used including File Transfer Protocol (FTP), etc.

In accordance with the present invention, a client within data processing system network 102, such as client 112, includes a messaging system client application 114 (e.g., a Web browser program such as Netscape Communicator, the Microsoft Internet Explorer, Spry Mosaic, NCSA Mosaic, Lynx, Opera, GNUscape Navigator, etc.) capable of transmitting and receiving messages containing commands to and from a messaging system server application 116 within a server, such as server 106, within data processing system network 102. Commands may be issued by client application 114 to server application 116 in order to cause some operation to be performed by server 106, such as the sending of specific data over the Internet to the client application 114. More specifically, browser application 114 includes HTTP software to function as an HTTP client to transfer document requests to the servers. In alternative embodiments, the content may be distributed over a network other than the Internet, such as a LAN or Intranet. The client may comprise any computing device known in the art, such as a personal computer, laptop computer, hand held computer, server, cellular phone, telephony device, network appliance, etc.

Client 112 may execute one or more user applications 118, either within browser application 114 or apart from browser application 114, which are capable of sending and retrieving data over the Internet 108 to and from servers 104–106. One or more of the applications 118 may also reside in proxy server 121. Such user application(s) 118 include the functionality described below to provide the display of a finished reading button with at least one displayed page in a document, to delay the sending of any selected hyperlinks until the finished reading button is selected, and to maintain a list of selected hyperlinks in memory. Some of this function, as further described below, can be provided by a proxy server.

In a preferred embodiment, servers 104–106 contain Hypertext Markup Language (HTML) Web pages. HTML provides basic document formatting and allows the developer to specify links to other servers and files. Use of an HTML-compliant client browser involves specification of a link via a Uniform Resource Locator or "URL". Users may access an HTML document from over the Internet and then use an HTML or web browser to display the downloaded file. The advantage of such HTML browsers is that they can execute on many different computing environments and numerous types of operating systems. Thus, an information provider need only code a document in HTML to make that document available to just about every computing platform that provides Internet access.

Figure 2:
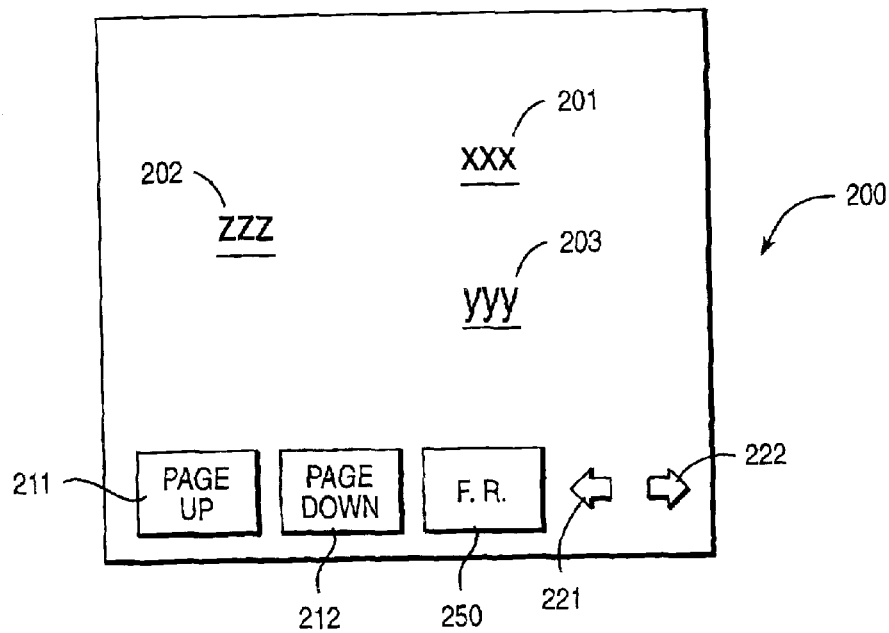
FIG. 2 illustrates a Web document containing hyperlinks to other Web documents.

FIG. 2 illustrates a Web document 200 that contains hyperlinks 201, 202, 203 for other Web documents. The "page up" 211 and "page down" 212 buttons allow navigation through a same page encompassing more than one screen display of data. The left arrow 221 and the right arrow 222 keys allow access to a previous or next page to complete the reading of the same document when the document is longer than one page. While reading the currently displayed content on the screen, the user would select any of the hyperlinks of interest appearing within that content on that screen. The Web browser saves any of the selected hyperlinks in a list. By default, the list may be ordered according to the order in which the hyperlinks were selected or according to the order in which they appear in the original document. The default order may be specified by the user. In addition, the user may edit the list and change the order. When the user is finished reading the currently displayed document, or whenever the user is ready to access the next hyperlink in the list, the user selects the "Finished Reading" button 250. Upon selection of the "Finished Reading" button 250, the browser retrieves the URL document that is next on the list of selected hyperlinked documents.

It should be noted that the "Finished Reading" button is a user selectable input means, e.g., a selectable object or button, capable of providing an indication to the Web browser that the user is finished reading the currently displayed document and desires to view a hyperlinked document next on the list. The selectable button is not associated with any specific hyperlink, i.e., it is independent of a given hyperlink. A selection of the button displays a next hyperlinked document in the list, whatever hyperlink that may be. Reference to a "next hyperlink in the list" refers to a next hyperlink from the top of the list that has not yet been rendered to the screen.

In a preferred embodiment, the "Finished Reading" button appears in a menu bar that is active for each screen display of data. That is, a user is able to select the "Finish Reading" button even if the user is not at the end of the document or the end of page within a document. In other words, the user can select the "Finish Reading" button while any portion of a document is displayed on the screen. This is especially advantageous when displaying content on small devices having small display screens. As such, the user can terminate reading the document without going to the end of the document. For example, a user can finish reading a document when the user is on the seventh page of a ten page document. Other embodiments may deactivate the "Finish Reading" button on the menu bar until the end portion of a document or page is being displayed. In such an embodiment, the user can only select the "finish reading" button at the end of the document or page.

Still yet other embodiments may save screen real estate by inserting the "Finished Reading" button as a special control at the end of a long page or document. This insertion can be performed by a proxy server in the following manner. After requesting a specific URL for a hyperlinked document, the proxy server receives the requested hyperlinked document. The proxy server performs transcoding on the hyperlinked document and inserts the special control at the end of the document. After the document is transcoded with the special control, the proxy server sends it to the Web browser at the client for rendering on the screen display for viewing by the user.

Figure 3:
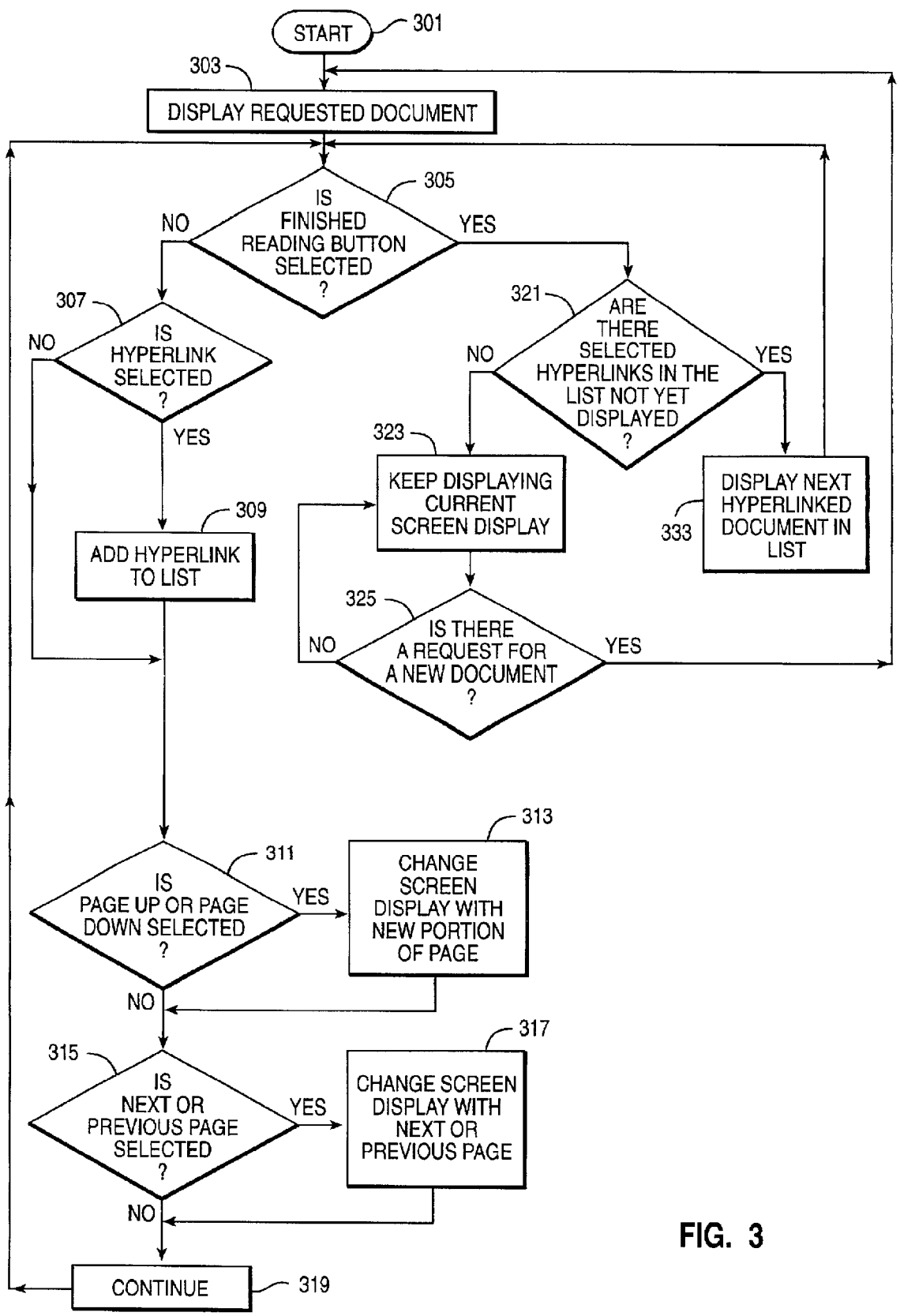
FIG. 3 illustrates a process flow and logic means of a preferred embodiment of the invention.

FIG. 3 illustrates the process flow and logic means of a preferred embodiment of the invention. The processing and logic flow starts at block 301 when the Web browser displays a requested document 303. The Web browser waits for user input and determines whether the input is a selection of a "Finished Reading" button 305, a selection of a hyperlink 307, a selection for page up or page down 311, or a selection of a next or previous page 315. If no input is received, processing continues 319 by waiting for input to be received or until the browser is closed. If it is determined that a hyperlink is selected 307, then the hyperlink is added to a list 309. If a "page up" or "page down" key or button is selected 311, then the browser changes the screen content with a new portion of a page as specified 313. If a "next page" or "previous page" key or button is selected 315, then the browser changes the screen content with a next or previous page of the document 317.

If the "Finished Reading" button is selected 305, then it is determined whether or not there are any selected hyperlinks in the list that have not yet been displayed, 321. If there are no hyperlinks in the list, then the browser keeps displaying the current content 323 until there is a request for a new document. If a new document is requested 325, then the browser displays the requested document 303 and the process continues as described above. While no new document is being requested 325, the browser continues to display the current screen content 323 while continuing to wait for a new document to be requested 325. If it is determined that there are hyperlinks in the list 321, then the browser displays the next hyperlinked document in the list 333. With this hyperlinked document displayed, processing continues as described pursuant to the type of user selection received, as described above.

Figure 4:
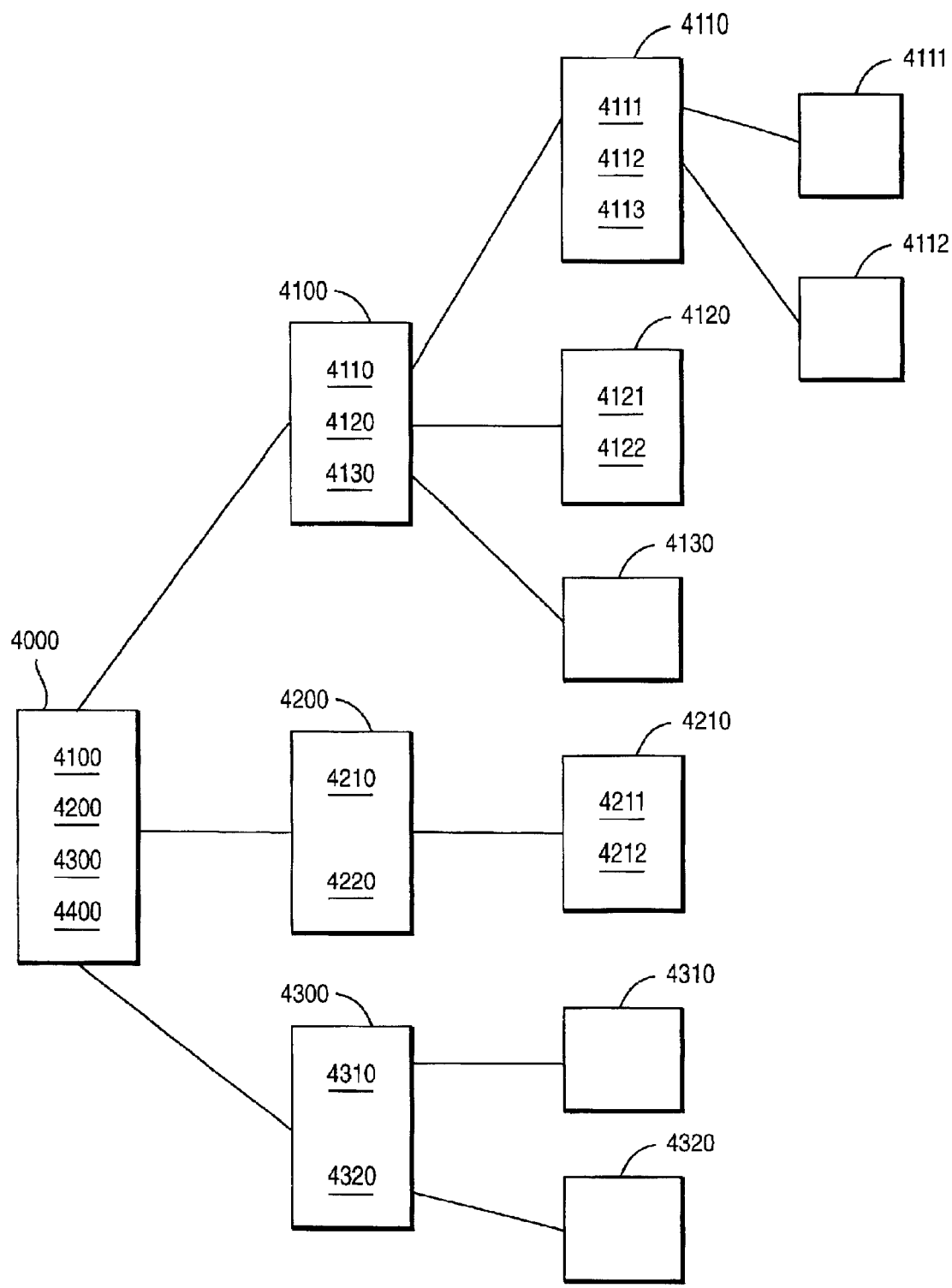
FIG. 4 illustrates a Web document and other hyperlinked Web documents.
Figure 5A:
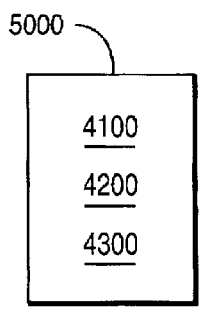
FIGS. 5A–5E illustrate an order of selected hyperlinks in the list of selected hyperlinks.

With reference to FIG. 4, FIGS. 5A–5E and FIGS. 6A–6C, a description of the ordering of the hyperlinks in the list of selected hyperlinks is given. With reference to FIG. 4, a Web document 4000 having hyperlinks 4100, 4200, 4300, 4400 is displayed to a user. The user selects hyperlinks 4100, 4200, and 4300. In one embodiment, the selected hyperlinks appear in the same order in the list of selected hyperlinks as the hyperlinks appeared in the previous Web document 4000. For example, FIG. 5A shows the hyperlinks 4100, 4200, 4300 in the selected list of hyperlinks 5000 in the same order as they appeared in the Web document 4000, FIG. 4. It should be noted that in other embodiments, the list of selected hyperlinks can be ordered according to the order in which the user selected them. That is, if the user selected hyperlink 4200 first, and then 4300 and 4100, then the list of hyperlinks would have the hyperlinks ordered as 4200, 4300, and then 4100.

Reference herein to a sequential order or an order that reflects the order in which the hyperlinks were selected refers to both a) an order that reflects exactly the order in which the user selected them including the order of selection within a same document, and b) an order that reflects the sequence of documents in which hyperlinks were selected; although the ordering of the selected hyperlinks within a same document reflects the order in which the hyperlinks were presented in that document and not necessarily the order in which they were selected within that document by the user.

Figure 5B:
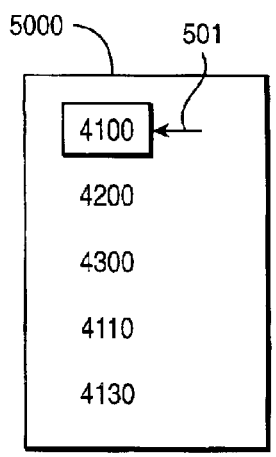

Referring back to FIG. 4, after the user selected each of the hyperlinks of interest (e.g., 4100, 4200, and 4300), each selected hyperlink would appear in the list of selected hyperlinks 5000, FIG. 5A. After the user finished reading Web document 4000, and the user selected the "finished reading button", then the Web browser would use the first hyperlink 4100 in the list of selected hyperlinks 5000 to retrieve and display the next document 4100 shown in FIG. 4. As shown, document 4100, FIG. 4 contains three hyperlinks 4110, 4120, and 4130. For an example, assume the user selects two of these hyperlinks, hyperlink 4110 and hyperlink 4130. In one embodiment, as shown in FIG. 5B, when the user selects these two hyperlinks, they are added to the list of selected hyperlinks after the previously selected hyperlinks as shown in FIG. 5B. In another embodiment as shown in FIG. 6B, the hyperlinks 4110 and 4130 are added to the list of selected hyperlinks 5000 in a way that reflects the hyperlinked relationship. That is, hyperlinks 4110 and 4130 are inserted in the list below hyperlink 4100. In addition hyperlinks 4110 and 4130 are shown indented when the list is displayed to the user to represent that they are links from yet a further level out from the original document having selected links 4100, 4200 and 4300.

Now, referring back to FIG. 4, after the user finished selecting the hyperlinks of interest (e.g., 4110 and 4130) and selected the "finished reading" button for document 4100, then the Web browser would use the next hyperlink in the list of selected hyperlinks 5000 to retrieve and display the next document. According to one embodiment, as shown in FIG. 5B, the next hyperlink is hyperlink 4200 so document 4200 as shown in FIG. 4 would be displayed. According to another embodiment, as shown in FIG. 6B, the next hyperlink is hyperlink 4110 so document 4110 as shown in FIG. 4 would be displayed to the user next.

Figure 5C:
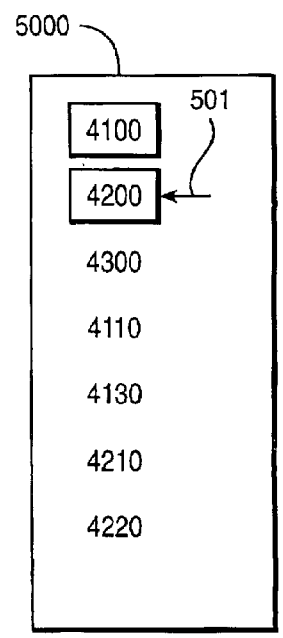
Figure 5D:
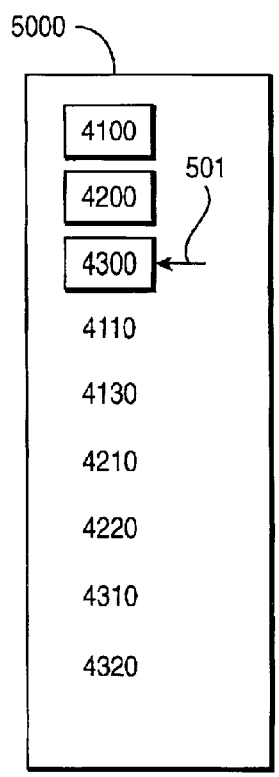
Figure 5E:
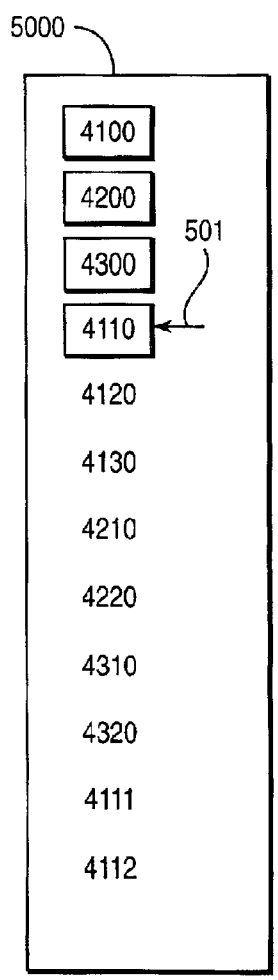

As such, one embodiment, as shown in FIG. 4 and FIGS. 5A–5E, shows the original document 4000 being displayed first with hyperlinks 4100, 4200, 4300 being selected and ordered accordingly in the selected hyperlink list 5000 FIG. 5A. The next document to be displayed is document 4100, FIG. 4. Hyperlinks 4110 and 4130 from document 4100 are selected and added to the bottom of the selected hyperlink list 5000 as shown in FIG. 5B. The next document to be displayed is document 4200. Hyperlinks 4210 and 4220 from document 4200 are selected and added to the bottom of the selected hyperlink list 5000 as shown in FIG. 5C. The next document to be displayed is document 4300, FIG. 4. Hyperlinks 4310 and 4320 from document 4300 are selected and added to the bottom of the selected hyperlink list 5000 as shown in FIG. 5D. The next document to be displayed is document 4110, FIG. 4. Hyperlinks 4111 and 4112 from document 4110 are selected and added to the bottom of the selected hyperlink list 5000 as shown in FIG. 5E. The displaying of hyperlinked documents and the ordering of the selected hyperlinks continue in a similar fashion as described.

Figure 6A:
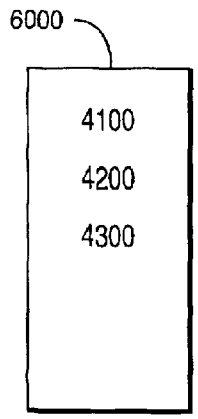
FIGS. 6A–6C illustrate another order of selected hyperlinks in the list of selected hyperlinks.
Figure 6B:
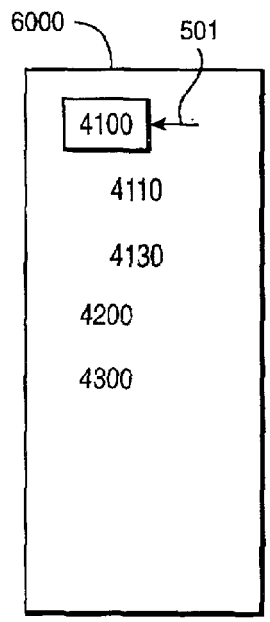
Figure 6C:
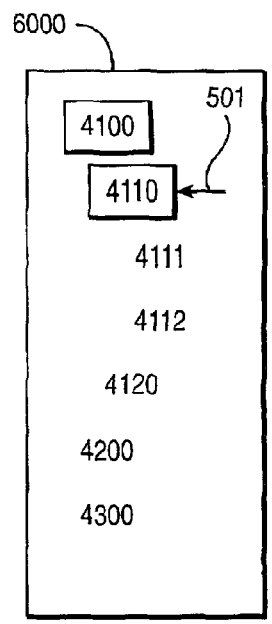

In another embodiment, FIG. 4 and FIGS. 6A–6C show the original document 4000 being displayed first with hyperlinks 4100, 4200, 4300 being selected and ordered accordingly in the selected hyperlink list 6000, FIG. 6A. The next document to be displayed is document 4100, FIG. 4. Hyperlinks 4110 and 4130 from document 4100 are selected and inserted into the selected hyperlink list 6000 as shown in FIG. 6B. The next document to be displayed is document 4110. Hyperlinks 4111 and 4112 from document 4110 are selected and inserted into the selected hyperlink list 6000 as shown in FIG. 6C. The next document to be displayed would be document 4111, FIG. 4. The displaying of hyperlinked documents and the ordering of the selected hyperlinks continue in a similar fashion as described. The automatic ordering of the hyperlinks in the list of selected hyperlinks reflects the nesting of the hyperlinked documents, i.e., it reflects the hyperlinked relationship of the documents.

It should be noted that in one embodiment the selected hyperlinks are automatically added to the list of selected hyperlinks after the "finished reading" button is selected, In another embodiment, the selected hyperlinks are automatically added to the list as they are being selected. Likewise, if a link is deselected before the "finished reading" button is selected, then it is automatically and simultaneously removed from the list of selected hyperlinks.

As shown, once a hyperlink in the list is used to display the corresponding hyperlinked document, then the hyperlink in the list includes an indication as such. For example, it may become shaded or highlighted, or an indication may be added next to it. In addition, one or more indications, such as an arrow 501, may be added adjacent to a hyperlink in the list to show the current hyperlinked document being displayed, or to show the next hyperlink or to show both.

Figure 7:
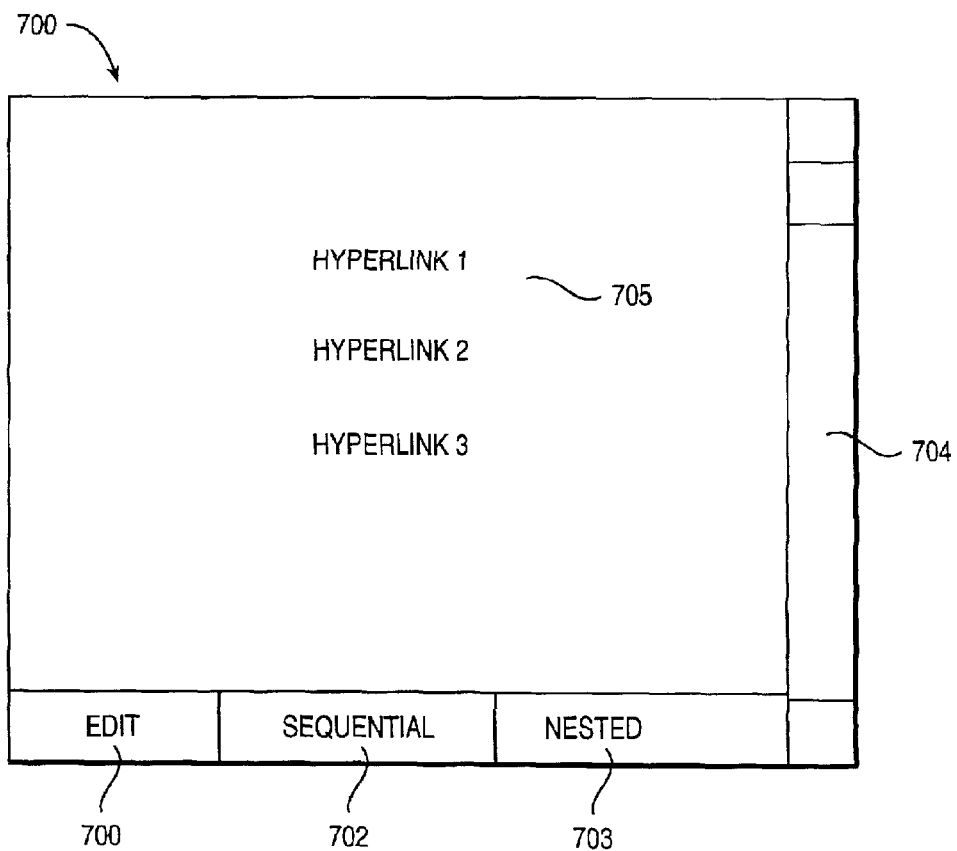
FIG. 7 illustrates a user interface for the list of selected hyperlinks.

FIG. 7 illustrates a user interface for the list 705 of selected hyperlinks. When selected, the edit button 701 allows a user to drag and drop the hyperlinks into any order. The edit button 701 also allows a user to click on a hyperlink. If the hyperlink has an indication that indicates that it has been previously displayed, upon clicking the hyperlink, the indication will disappear and the hyperlinked document will be displayed again when it is the next one from the top of the list in the ordered list of hyperlinks to be displayed. If the hyperlink has not yet been displayed, a click on the hyperlink will stop it from being displayed when it otherwise would be the next hyperlink in the list to be displayed. Hyperlinks can also be deleted from the list by the user. Upon selection of the "sequential" button 702, the list of selected hyperlinks is reordered into a sequential list such as by the order in which the hyperlinks were selected or according to the position of the hyperlinks from an originally displayed document, as shown, for example, in FIGS. 5A–5E. Upon selection of the "nested" button 703, the list of selected hyperlinks are reordered in a way that represents the hyperlinked or nested structure of the hyperlinks documents, as shown, for example, in FIGS. 6A–6C.

The list 705 of selected hyperlinks may appear within the same browser window as the currently displayed document or as a separate window. The list can also be displayed upon activation of a button or selection of a menu item. Likewise, the list can disappear from the user's view when deselected in order to maximize screen real estate for the displayed document. Also, it should be noted that the size of the window displaying the list can be re-sized. In addition, the hyperlinks in the list can be scrolled such as by using the scroll bar 704.

It has been noted that the invention is advantageous for the selection of hyperlinks and the displaying of selected hyperlinks by a Web browser on a small client device such as a personal digital assistant (PDA), palmtop, cell phone, or the like. However, the invention still has similar advantages for a Web browser on any client device. In addition, for client devices having sufficient memory or other local storage, the Web browser may go ahead and retrieve any selected hyperlinked document upon selection by the user of the hyperlink, and keep the retrieved document in storage local to the client device. The Web browser would then retrieve the hyperlinked document from local storage and display it when the hyperlinked document appeared next on the list of selected hyperlinked documents and when the user had so indicated a desire to view a next hyperlinked document, such as by selecting a "finished reading" button.

In summary, an enhanced Web browser on a client computational device is enabled to a) receive a selection, from a user, of at least one hyperlink within a document currently being displayed on the client device; b) store the selected hyperlinks, in direct response to receiving the selection, in a list in memory of the client device or in memory accessible by the device such as in another computational device that is accessible over a network communication link (wherein the selected hyperlinks are stored in the list independently of, i.e., without, displaying a corresponding hyperlinked document in response to the selection); c) provide a selectable object in conjunction with the displaying of a document; and d) in response to receiving an indication through the selectable object, displaying a hyperlinked document that is next in the list to be displayed. The hyperlinks can be stored in the list, and thus displayed, in a sequential order reflecting the order in which the hyperlinks were selected or the order in which the documents containing them were displayed, or in a nested order reflecting the hyperlinked structure of the hyperlinked documents, or in any other predefined order or other order as changed or edited by a user. A user can select to display the hyperlink list. When displayed, the list can be edited by a user such as by enabling the list to be reordered or to enable hyperlinks to be deleted from the list. It should be noted that either the URL will be displayed in the list as the hyperlink or other identifying means for the URL will be displayed, or both. Other identifying means may be the title of a document as presented in a previous document containing the hyperlink.

The Web browser displays the selectable object in conjunction with a display of at least the end of a document, if not also any other portion of the document.

In an alternative embodiment, a proxy server receives a request for a document from the Web client, receives the document from the corresponding server in the network, inserts the selectable object at the end of any requested document, and then sends the requested document with the inserted selectable object to the Web browser client. The user selectable object, upon its selection, causes a Web browser program to display a hyperlinked document identified by a next hyperlink in a list of hyperlinks.

It should be noted that upon selection of a hyperlink in a document, the selected hyperlink is not displayed. Instead, the selected hyperlink is stored in a list. A hyperlinked document is not displayed until the selectable object, which is not associated with any specific hyperlink, is selected. Upon selection of the selectable object, the hyperlinked document displayed is whatever hyperlinked document is next from the top in the list that has not yet been displayed.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMS, DVDS, read only memories (ROMs) or erasable, electrically programmable read only memories (EEPROMs), recordable type mediums such as floppy disks, hard disk drives and CD-RW and DVD-RW disks, and transmission type mediums such as digital and analog communication links, or any signal bearing media. As such, the functionality of the above described embodiments of the invention can be implemented in hardware in a computer system and/or in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for use in a CD ROM) or a floppy disk (for eventual use in a floppy disk drive), or downloaded via the Internet or other computer network, as discussed above. The present invention applies equally regardless of the particular type of signal-bearing media utilized.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

What is claimed is:

1. A method for displaying selected hyperlinked documents, comprising:
   inserting a selectable button in a requested document for display, wherein the selectable button is independent of a forward/backward button for navigating currently and previously displayed documents, and wherein a selection of the button is for indicating retrieval of a next hyperlinked document in a stored list of previously selected but undisplayed hyperlinked documents;
   receiving a selection, from a user, of at least one hyperlink of interest in the requested document;
   storing, upon selection by the user, the selected at least one hyperlink in the stored list without correspondingly displaying content associated with the selected at least one hyperlink; and in response to receiving an indication, through the selectable button, from the user that the user is finished with a currently displayed document, automatically displaying a next hyperlinked document that is next in the stored list.

2. The method of claim 1 wherein storing the selected at least one hyperlink in a list further comprises storing the selected hyperlinks in a sequential order reflecting a sequence in which documents having the selected hyperlinks were displayed.

3. The method of claim 1 wherein storing the selected at least one hyperlink in a list futher comprises storing the selected hyperlinks in an order reflecting the hyperlinked structural relationship of the selected hyperlinks in the list.

4. The method of claim 1 wherein the selectable button is inserted on each displayed document page through which the indication is received.

5. The method of claim 1 wherein the selectable button is inserted at an end of a displayed document through which the indication is received.

6. The method of claim 1 further comprising displaying the list.

7. The method of claim 6 wherein displaying the list further comprises enabling the selected hyperlinks in the displayed list to be reordered.

8. A method for displaying, on a screen of a computational device, selected hyperlinked documents, comprising:
  inserting a selectable object in a requested document for display, wherein the selectable object is independent of a forward/backward button for navigating currently and previously displayed documents, and wherein a selection of the object is for indicating retrieval of a next hyperlinked document in a stored list of previously selected but undisplayed hyperlinked documents;
  receiving a selection, from a user, of at least one hyperlink within the requested document currently being displayed;
  in response to receiving the selection, storing the selected at least one hyperlink in the stored list in memory accessible by the computational device without displaying a corresponding hyperlinked document in response to the selection;
  in response to receiving an indication through the selectable object provided in conjunction with the displaying of displayed documents, displaying a next hyperlinked document that is next in the stored list.

9. A computer system having means for displaying documents requested over a network of computers, the computer system comprising:
  a user selectable object, independent of a given hyperlink, in a requested document for display, wherein the user selectable object is independent of a forward/backward button for navigating currently and previously displayed documents, and wherein a selection of the object is for indicating retrieval of a next hyperlinked document in a stored list of previously selected but undisplayed hyperlinked documents;
  means for receiving a selection, from a user, of at least one hyperlink of interest in the requested displayed document;
  means for storing the selected at least one hyperlink in the stored list without displaying a corresponding hyperlinked document in response to the selection;
  means for automatically displaying a next hyperlinked document that is next in the stored list in response to receiving input from the user selectable object.

10. The computer system of claim 9 wherein the user selectable input means is enabled to receive input when each portion of the document is displayed.

11. The computer system of claim 9 wherein the user selectable input means is enabled to receive input when an end of a document page is displayed.

12. The computer system of claim 9 wherein the user selectable input means is enabled to receive input when an end of a document is displayed.

13. The computer system of claim 9 further comprising means for displaying the list.

14. The computer system of claim 13 further comprising means for enabling the list of hyperlinks to be reordered.

15. A computer program having computer readable program code means on a computer usable medium, comprising:
  means for enabling a user selectable object to be enabled in conjunction with a displaying of at least a portion of a document, wherein the user selectable object is independent of a forward/backward object for navigating currently and previously displayed documents, and wherein a selection of the object is for indicating retrieval of a next hyperlinked document in a predefined ordered list of previously selected but undisplayed hyperlinked documents;
  means for enabling a storing in the predefined ordered list of at least one selected hyperlink;
  means for displaying a next hyperlinked document identified by a next stored hyperlink in the list upon a selection of the user selectable object.

16. A computer program having a computer readable program code means on a computer usable medium, comprising:
  means for receiving a request for a document;
  means for receiving the document from a server;
  means for inserting a user selectable control in conjunction with at least a portion of the document wherein the user selectable control causes a program to display a next hyperlinked document identified by a next hyperlink in a list of previously selected but undisplayed hyperlinked documents, and wherein the user selectable control is independent of a forward/backward object for navigating currently and previously displayed documents; and
  sending the document wish the inserted control to the requester.

17. A computer program having a computer readable program code means on a computer usable medium, comprising:
  means for receiving a requested document;
  means for inserting a user selectable control in conjunction with at least a portion of the document wherein the user selectable control causes a program to display a next hyperlinked document identified by a next hyperlink in a list of previously selected but undisplayed hyperlinked documents, and wherein the user selectable control is independent of a forward/backward object for navigating currently and previously displayed documents; and
  displaying the document with the inserted control.

18. A computer system comprising:
  means for receiving a request for a document;
  means for receiving the document from a communicatively linked second computer system;

means for inserting a user selectable control at an end of the document wherein the user selectable control causes a program to display a next hyperlinked document identified by a next hyperlink in a list of previously selected but undisplayed hyperlinked documents, and wherein the user selectable control is independent of a forward/backward object for navigating currently and previously displayed documents; and sending the document with the inserted control to the requester.

* * * * *